United States Patent
Hutchens et al.

(10) Patent No.: US 8,613,423 B2
(45) Date of Patent: Dec. 24, 2013

(54) METHODS AND APPARATUS TO LOAD A VALVE PACKING

(75) Inventors: Wilbur Dean Hutchens, Marshalltown, IA (US); Randall Scott Collison, Bondurant, IA (US); Loren Lee Bovee, Marshalltown, IA (US); David Charles Stanze, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1124 days.

(21) Appl. No.: 12/535,304

(22) Filed: Aug. 4, 2009

(65) Prior Publication Data

US 2011/0006242 A1 Jan. 13, 2011

Related U.S. Application Data

(60) Provisional application No. 61/225,155, filed on Jul. 13, 2009.

(51) Int. Cl.
*F16K 31/44* (2006.01)

(52) U.S. Cl.
USPC ...... 251/214; 137/315.28; 277/511; 277/521; 277/523

(58) Field of Classification Search
USPC .......... 251/214; 277/511, 522, 523, 321, 520; 137/315.28
See application file for complete search history.

(56) References Cited

U.S. PATENT DOCUMENTS

| | | | |
|---|---|---|---|
| 534,575 A * | 2/1895 | Platts et al. | 277/321 |
| 548,089 A * | 10/1895 | Platts et al. | 277/467 |
| 806,489 A * | 12/1905 | Peck | 277/523 |
| 819,227 A * | 5/1906 | Hoyer | 277/518 |
| 1,849,912 A * | 3/1932 | Daddysman | 277/379 |
| 2,119,033 A * | 5/1938 | Andrew | 277/523 |
| 2,130,741 A * | 9/1938 | McClain | 277/520 |
| 4,468,039 A | 8/1984 | Le et al. | |

(Continued)

FOREIGN PATENT DOCUMENTS

| | | |
|---|---|---|
| DE | 3937316 | 10/1990 |
| DE | 102006022212 | 11/2007 |

OTHER PUBLICATIONS

International Searching Authority, "International Search Report," issued in connection with international application serial No. PCT/US2010/038025, mailed Oct. 5, 2010, 4 pages.

(Continued)

*Primary Examiner* — John K Fristoe, Jr.
*Assistant Examiner* — Marina Tietjen
(74) *Attorney, Agent, or Firm* — Hanley, Flight & Zimmerman, LLC.

(57) ABSTRACT

Methods and apparatus to load a valve packing are described. An example apparatus to load a valve packing includes a load assembly having a biasing element disposed between a valve packing flange and a stop flange to provide a load to a seal assembly. The packing flange is adjustable relative to the stop flange to adjust the load to be applied to the seal. A first guide member coupled to the packing flange or the stop flange provides a first predetermined distance between the packing flange and the stop flange. The first guide member provides an indication of a first predetermined load to be provided by the load assembly when the packing flange and the stop flange are spaced at the first predetermined distance provided by the first guide member.

15 Claims, 9 Drawing Sheets

(56) References Cited

U.S. PATENT DOCUMENTS

| | | | |
|---|---|---|---|
| 4,516,752 A | | 5/1985 | Babbitt et al. |
| 4,582,329 A | * | 4/1986 | Stalph .................. 277/506 |
| 4,765,631 A | * | 8/1988 | Kohnen et al. ............. 277/320 |
| 4,773,442 A | * | 9/1988 | Lephilibert ............. 137/315.28 |
| 5,024,453 A | | 6/1991 | Suggs |
| 5,129,625 A | | 7/1992 | Wood et al. |
| 5,192,049 A | | 3/1993 | Ridge |
| 5,290,010 A | | 3/1994 | Ridge |
| 5,299,812 A | | 4/1994 | Brestel et al. |
| 5,316,319 A | * | 5/1994 | Suggs .................. 277/308 |
| 5,456,447 A | * | 10/1995 | Reynolds ............... 251/214 |
| 5,542,681 A | | 8/1996 | Hutchens et al. |
| 5,549,305 A | * | 8/1996 | Freund ................. 277/511 |
| 6,382,633 B1 | * | 5/2002 | Hashiguchi et al. .......... 277/511 |
| 6,588,729 B1 | | 7/2003 | Kimpel |
| 6,622,987 B2 | * | 9/2003 | Sterud .................. 251/214 |
| 7,367,079 B2 | * | 5/2008 | Schwade et al. ............ 15/315 |
| 2008/0047616 A1 | | 2/2008 | Lovell et al. |

OTHER PUBLICATIONS

International Searching Authority, "Written Opinion of the International Searching Authority," issued in connection with international application serial No. PCT/US2010/038025, mailed Oct. 5, 2010, 4 pages.

Emerson Process Management, "High-Seal ULF Live-Loaded Packing System," Instruction Manual, published Mar. 2007, 8 pages.

* cited by examiner

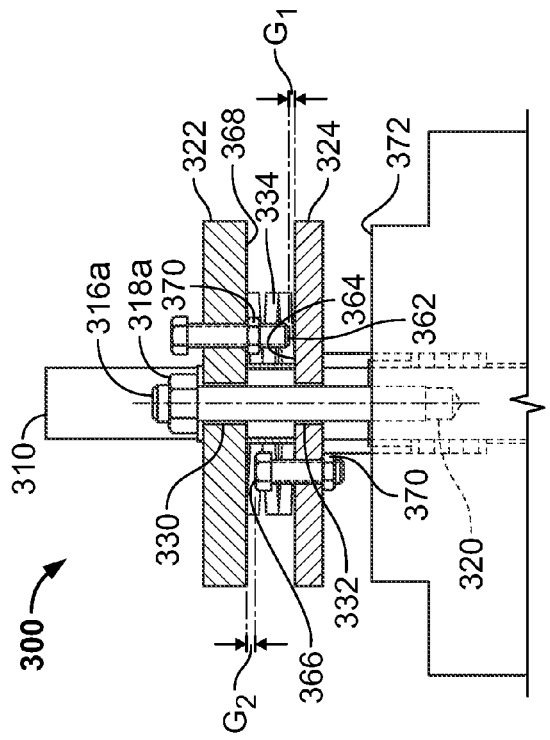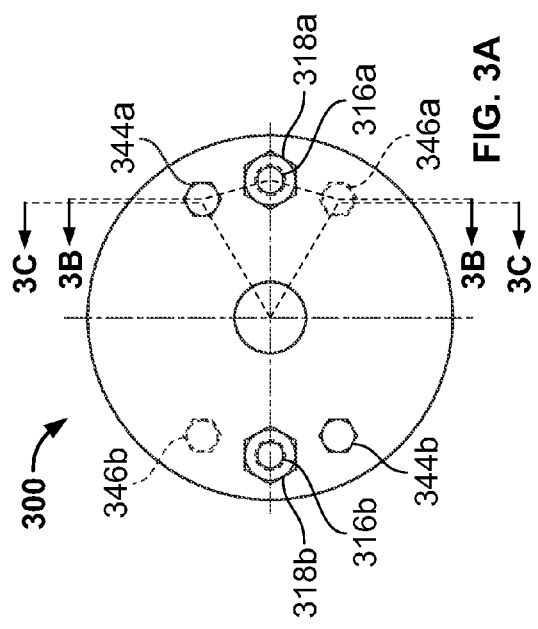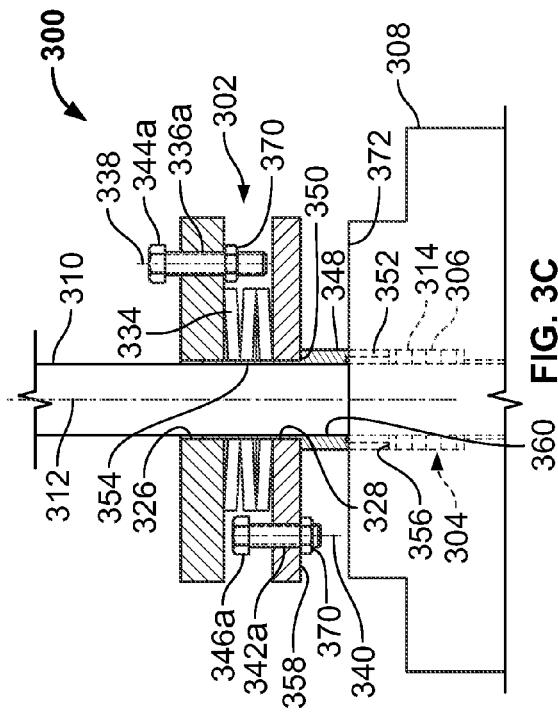

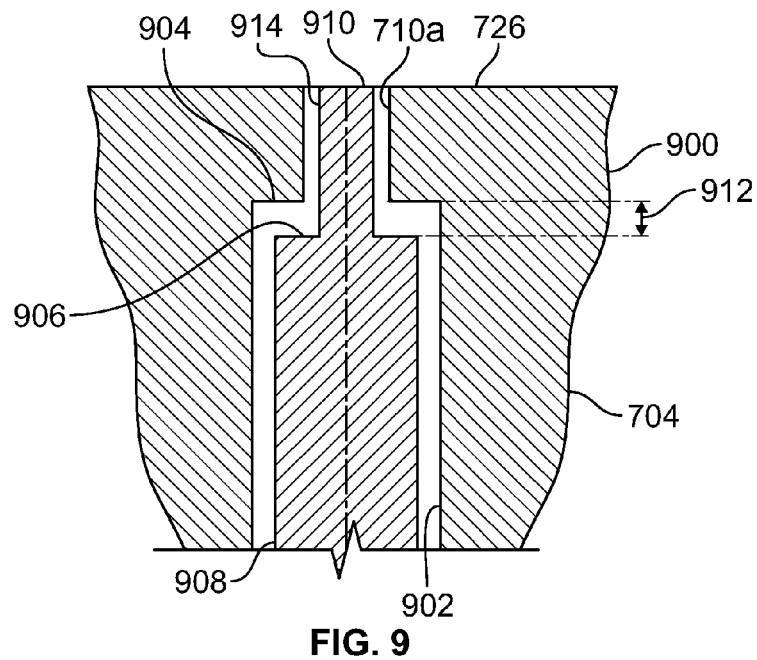
FIG. 9
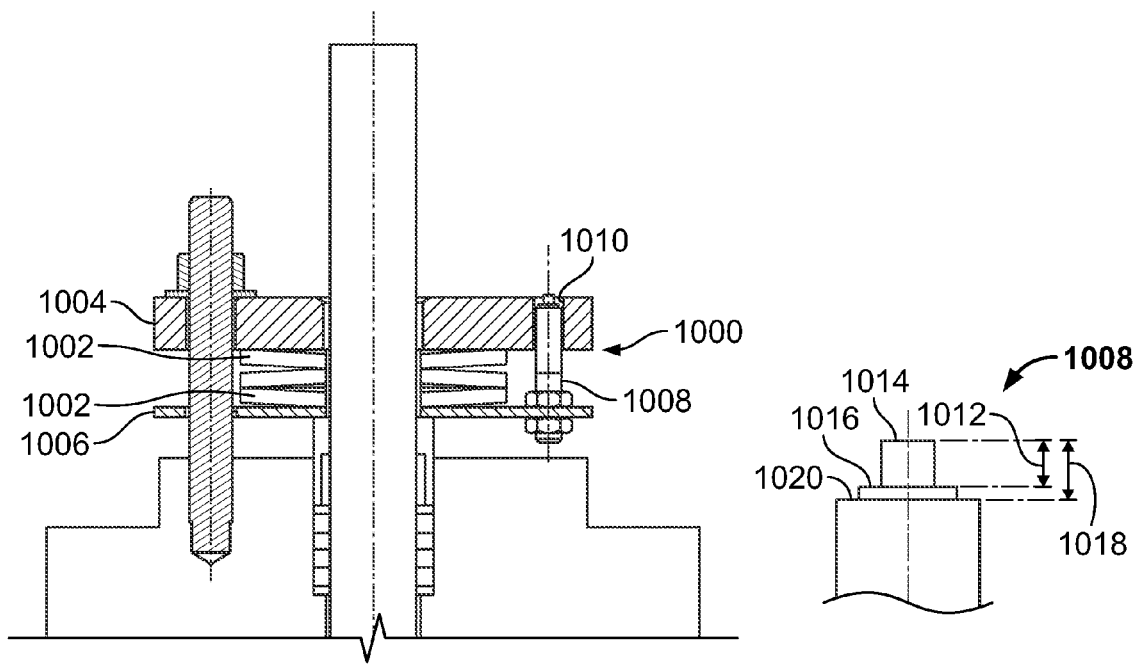
FIG. 10A  FIG. 10B

METHODS AND APPARATUS TO LOAD A VALVE PACKING

CROSS-REFERENCE TO RELATED APPLICATION

This patent claims the benefit of U.S. Provisional Application Ser. No. 61/225,155, filed on Jul. 13, 2009, which is hereby incorporated by reference in its entirety.

FIELD OF THE DISCLOSURE

This disclosure relates generally to fluid valves and, more particularly, to methods and apparatus to load a valve packing.

BACKGROUND

Process control plants or systems often employ fluid valves, such as rotary valves, linear valves, etc., to control the flow of process fluids. In general, fluid valves typically include a fluid flow control member that is disposed in the fluid path and which is operatively coupled to an actuator such as, for example, a pneumatic actuator, a manual actuator, etc. A valve stem or shaft operatively couples the flow control member to the actuator, which moves the flow control member between an open position and a closed position to allow or restrict fluid flow between an inlet and an outlet of the valve. Typically, the valve stem or shaft extends between the flow control member and the actuator through a bonnet coupled to the valve body.

A valve packing or packing assembly is often employed to prevent undesired leakage of process fluid to the environment through the valve body along the valve stem or shaft. The valve packing may include a plurality of springs and/or packing seals disposed along a portion of the valve stem or shaft to provide a seal. Some known valve packings employ a high-spring rate loading device or spring assembly (e.g., Belleville springs) to provide a relatively high load over a relatively small range of deflection or compression. However, such known loading devices typically require very precise deflections and/or tightly held manufacturing tolerances to enable a desired packing stress to be applied to the packing seals.

Failure to provide a desired packing stress to the packing seals may cause an improper seal. For example, a packing stress that is too low may cause the process fluid to leak to the environment through the packing seals. A packing stress that is too large (e.g., greater than a maximum recommended packing stress) may cause some types of packing seals (e.g., graphite seals) to transfer material to a valve stem, thereby causing build-up of material on the valve stem and damaging the packing seal. Additionally or alternatively, packing stresses that are too high may increase packing friction between the packing seals and the valve stem or shaft, which may reduce valve performance and/or the operational life of the valve packing and/or the valve stem or shaft.

SUMMARY

In one example, an apparatus to load a valve packing includes a load assembly having a biasing element disposed between a valve packing flange and a stop flange to provide a load to a seal assembly. The packing flange is adjustable relative to the stop flange to adjust the load to be applied to the seal. A first guide member is coupled to the packing flange or the stop flange to provide a first predetermined distance between the packing flange and the stop flange. The first guide member provides an indication of a first predetermined load to be provided by the load assembly when the packing flange and the stop flange are spaced at the first predetermined distance provided by the first guide member.

In another example, a packing assembly for use with a valve includes a seat assembly disposed within a bore of a valve bonnet to provide a fluid seal around a valve stem or shaft. A first flange is operatively coupled to the seal assembly via a packing retainer and the first flange has a first opening. A second flange is disposed between the valve bonnet and the first flange and the second flange has a second opening. A biasing element is disposed between the first flange and the second flange and provides a packing stress to the seal assembly. A first guide member is disposed within the first opening of the first flange or the second opening of the second flange to provide a first predetermined distance between the first flange and the second flange that corresponds to a first predetermined packing stress to be provided to the seal assembly.

In yet another example a method to load a valve packing includes adjusting a packing flange nut to a position corresponding at least approximately to a free condition of a biasing assembly and coupling a first gauge member to a first flange. The method further includes adjusting a gap between a first surface of the first gauge member and a reference surface opposite the first flange to a first predetermined distance. The method further includes tightening the packing flange nut so that the first surface of the first gauge member substantially aligns with the reference surface and causes a load assembly to provide a first predetermined packing stress to the valve packing when the first gauge member substantially aligns with the reference surface.

In yet another example, a valve packing assembly includes means for providing a load to a seal assembly and means for providing an indication of a first predetermined load to be provided by the means for providing a load. The valve packing also includes means for coupling the means for providing an indication to the means for providing a load such that the means for providing an indication provides a predetermined distance between a first reference flange of the means for providing a load and a second reference flange of the means for providing load where the predetermined distance corresponds to the first predetermined load.

BRIEF DESCRIPTION OF THE DRAWINGS

FIGS. 3A-3C illustrate an example valve packing assembly described herein.

FIGS. 8 and 9 illustrate positive stop apparatus that may be used with the example valve packing assembly of FIGS. 7A-7D.

FIGS. 10A and 10B illustrate yet another example load assembly described herein that may be used to implement the valve packing assembly of FIGS. 3A-3C.

DETAILED DESCRIPTION

In general, the example methods and apparatus described herein provide precise control of packing stresses for live-load valve packings. More specifically, the example valve packing apparatus described herein include a load assembly that provides a desired or predetermined packing stress to a packing seal assembly based on a predetermined distance or deflection of a biasing element (e.g., a Belleville spring). The example load assemblies described herein enable precise control of an amount of deflection of a biasing element. In particular, controlling the deflection of the biasing element to a predetermined position, the load assemblies may be adjusted to provide a substantially constant desired packing stress to a packing seal assembly.

Additionally, the example methods and apparatus described herein enable a packing stress to be set or adjusted without causing a biasing element (e.g., a Belleville spring) to be fully compressed. Also, in some examples, precisely controlling packing stress may prevent packing material transfer to a valve stem and/or reduce friction between the packing seal and a valve stem or shaft. The example methods and apparatus described herein may also compensate for variations in stack height of multiple biasing elements as a result of material thickness variations of the elements (e.g., stack-up tolerances).

In particular, a valve packing apparatus described herein may include a first guide member that provides an indication of a packing stress applied to a packing seal assembly. The first guide member may prevent or restrict a load assembly from applying a packing stress to the packing seal assembly that is greater than a first predetermined packing stress (e.g., a nominal desired packing stress). In some examples, the valve packing apparatus may also include a second guide member to provide an indication of a second packing stress provided to the packing seal assembly. The second guide member may prevent or restrict the load assembly from applying a packing stress to the packing seal assembly that is greater than a second predetermined packing stress (e.g., a maximum desired packing stress).

In some examples, the load assembly of the valve packing assembly or apparatus includes a plurality of biasing elements (e.g., Belleville springs) disposed or stacked (e.g., in series) between a packing flange and a stop flange. A first guide member may be coupled to the packing flange or the stop flange to provide a first predetermined distance between the packing flange and the stop flange. The first guide member may provide an indication of the packing stress provided by the load assembly when the packing flange and the stop flange are spaced the first predetermined distance provided by the first guide member.

Figure 1A:
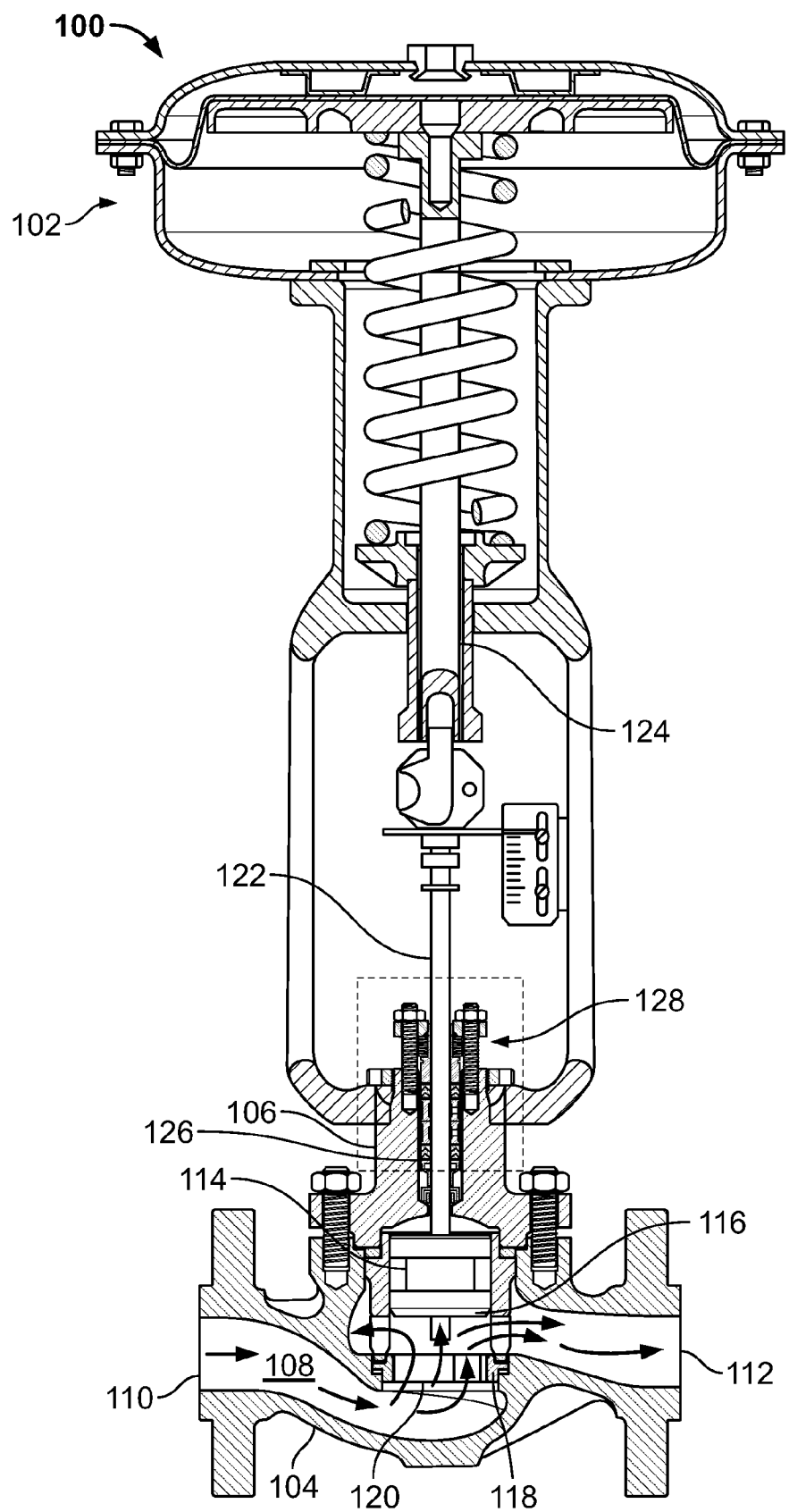
FIG. 1A illustrates a known fluid control valve.

Before describing the example valve packing apparatus, a brief discussion of a known pneumatically actuated fluid control valve 100 is provided in connection with FIG. 1A. The known fluid control valve 100 shown in FIG. 1A includes an actuator 102 operatively coupled to a valve body 104 via a bonnet 106. The valve body 104 defines a fluid flow passageway 108 between an inlet 110 and an outlet 112. A valve plug 114 is disposed within the fluid flow passageway 108 and includes a seating surface 116 that cooperates with a valve seat 118 to control a port area 120 through which fluid may flow between the inlet 110 and the outlet 112. A valve stem 122 couples the valve plug 114 to an actuator stem 124. The actuator stem 124 couples the valve stem 122 and the valve plug 114 to the actuator 102. The bonnet 106 includes a bore 126 to slidably receive the valve stem 122 and houses a valve packing assembly 128.

The valve packing assembly 128 provides a seal to prevent leakage of process fluid past the valve stem 122 and/or protects the environment against the emission of hazardous or polluting fluids. In other words, the valve packing assembly 128 provides a seal that opposes the pressure of the process fluid flowing through the valve 100. Thus, the valve packing assembly 128 must be properly or sufficiently loaded to provide a packing seal that can oppose the pressure of the process fluid flowing through the valve 100.

Figure 1B:
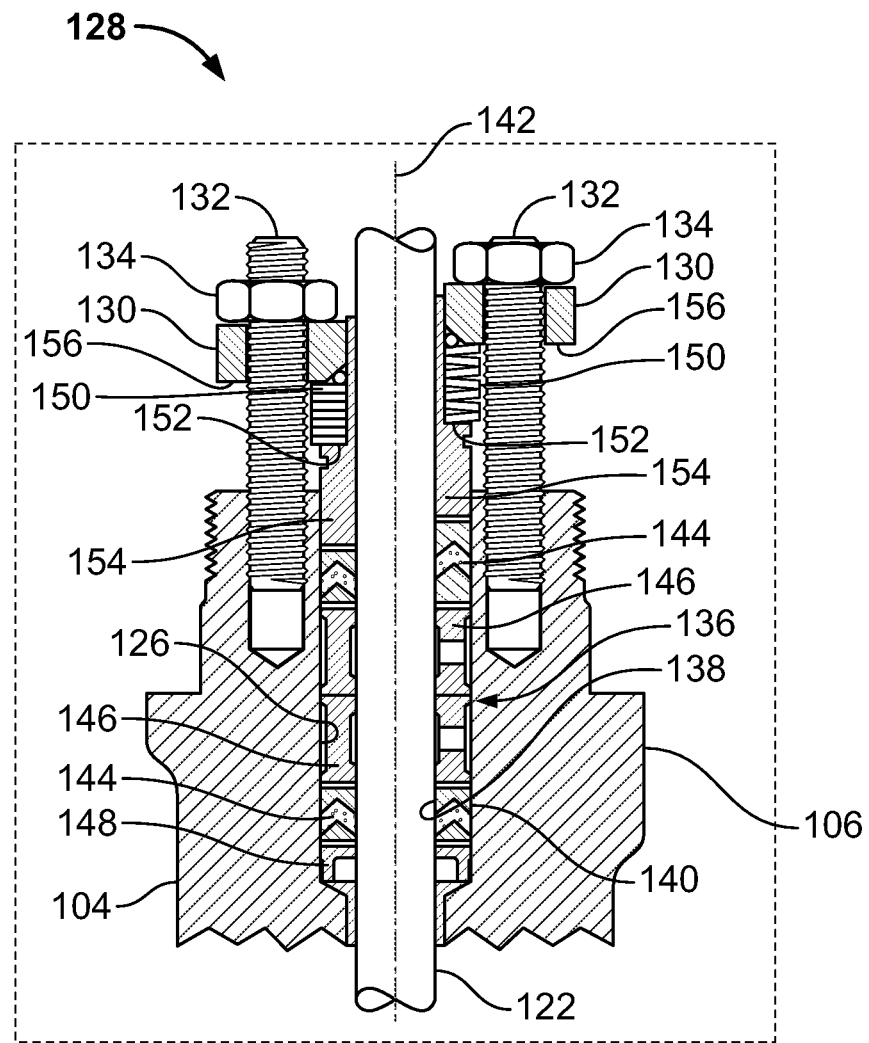
FIG. 1B is an enlarged view of a known valve packing of the fluid valve shown in FIG. 1A.

FIG. 1B depicts an enlarged split, partial cross-sectional view of the fluid control valve 100 of FIG. 1A. The left side of FIG. 1B shows the valve packing assembly 128 in a compressed or stressed condition and the right side of FIG. 1B shows the valve packing assembly 128 in an uncompressed or unstressed condition. As shown in FIG. 1B, the valve packing assembly 128 includes a packing flange 130 coupled to the bonnet 104 via packing studs 132 and packing nuts 134. A packing material or seal assembly 136 surrounds the valve stem 122 and is disposed within the packing bore 126 of the bonnet 104. The packing material 136 is typically compressed axially to ensure that an inner bore or surface 138 of the packing material 136 is sealed against the valve stem 122 and that an outer surface 140 of the packing material 136 is sealed against the bore 126 of the bonnet 104. Axially loading the packing material 136 about an axis 142 causes the packing material 136 to expand radially to effect a dynamic seal on the moving valve stem 122 and a static seal in the packing bore 126 where the packing material 136 is in contact with the packing bore 126. As shown in FIG. 1I, the packing material or seal assembly 36 includes packing seals 144, packing rings 146, and a packing box ring 148.

In the illustrated example, a plurality of biasing elements or springs 150 (e.g., Belleville springs) may be positioned or stacked in series between the packing flange 130 and a flange or shoulder 152 of a packing follower 154. The packing nuts 134 may be used to adjustably drive or urge the springs 150 against the packing follower 154 which, in turn, axially compresses the packing material 136 to provide a seal and prevent leakage of process fluid past the valve stem 122. As the packing nuts 134 are tightened on the packing studs 132, the packing flange 130 transmits a load to the springs 150. The springs 150 deflect or compress as the packing nuts 134 are tightened to provide a packing stress (e.g., an axial load) to the packing material 136 via the packing follower 154.

In this example, the springs 150 provide a live-load valve packing by providing a uniform load to the packing material 136 and maintaining such a uniform packing load during valve operation (e.g., valve stroking). In other words, the springs 150 provide a substantially constant load to the packing follower 154 to exert a substantially constant compressive force on the packing material 136. Thus, if the packing material 136 consolidates (e.g., due to wear), the springs 150 decompress to move the packing follower 154 toward the bonnet 104 to maintain a compressive force the packing material 136 and thereby maintain the seal integrity of the packing material 136.

Operating conditions (e.g., a temperature and/or a pressure of a process fluid) often determine the type of packing material to be used to provide an adequate seal for the particular process fluid or application. Some known packing materials such as, for example, graphite packing materials may be used in severe service conditions (e.g., process fluid temperatures greater than 450 F, pressures greater than 4,500 psig). However, such graphite packing materials may need to be precisely loaded with a proper packing stress or load to optimally function and/or provide a proper seal.

In the example of FIG. 1B, the springs 150 are Belleville springs. Typically, Belleville springs may be used to provide a relatively large loading force or packing stress to compress packing materials that are used in severe service conditions (e.g., high pressure applications). In general, a Belleville spring provides a relatively high packing stress relative to the travel or deflection imparted on the Belleville spring. In other words, a Beluville spring has a relatively high spring constant and, thus, a small or relatively low deflection or compression of a Belleville spring provides a relatively high packing stress or force. For example, Belleville springs that are stacked in series provide a load based on a proportion or the amount of deflection of the stack of Belleville springs (e.g., a percent of deflection relative to the stack height), regardless of the number Belleville springs stacked in series.

Additionally, live-load valve packings generally have tolerance stack-up due to material thickness variations between different springs. Because the Belleville springs generally provide a relatively high force-to-compression ratio (i.e., a high spring rate), such tolerance stack-up is an important consideration to precisely control the load or packing stress. Ignoring such a tolerance stack-up may cause the springs to provide a load that is greater than a maximum desired load, which may cause a packing material to fracture, transfer to a valve stem or otherwise become compromised.

Thus, Belleville springs typically need to be precisely compressed or deflected to provide a desired packing stress. Otherwise, if the packing stress provided is too high, high packing friction may result, which can reduce valve performance and/or reduce packing material operating life. Additionally, a packing stress that is relatively high or greater than a maximum desired packing stress may cause some packing materials such as graphite packing materials to transfer material to a valve stem, which may cause an improper seal or premature failure.

Referring to FIG. 1B, one method to adjust or control the deflection of the springs 150 is to measure a torque applied to the packing nuts 134 by using, for example, a torque wrench. However, a torque wrench may be unreliable due to, for example, variability of lubrication on the packing stud 132 and/or the packing nuts 134, different manufacturing processes used to form threads of the packing studs 132, the number of times the packing studs 132 and the packing nuts 134 have been used, etc. Such inaccurate loading from torque measurements may cause inaccurate packing stresses or loads to be applied to the packing material 136. As a result premature failure of the packing material 134 may occur even if the torque reading on the torque wrench indicates an acceptable torque measurement. Thus, measuring the packing nut torque to determine a proper packing stress may not be adequate to prevent premature failure of some packing materials such as a graphite packing materials.

Another method to control packing stress is to position the springs 150 to a maximum compression, flat or solid condition as shown in the left side of FIG. 1B by tightening the packing nuts 134. In this manner, compressing or deflecting tile springs 150 to the fully flat or solid condition provides an indication of the maximum possible load that can be provided by the springs 150. The packing nuts 134 are then loosened or backed off a certain amount (e.g., one-quarter of a turn or rotation) to decompress the springs 150 to a desired position that provides a nominal or desired packing stress to the packing material 136. For example, an operator or maintenance person subsequently loosens the packing nuts 134 a precise number of rotations or portion of a rotation (e.g., one-quarter of a rotation) to set the packing stress to a desired stress level. However, in some instances, compressing or deflecting the springs 150 to the fully flat or solid condition may cause the springs 150 to set or deform in the fully compressed or flat condition, thereby permanently damaging the springs 150.

In another example, a method to control packing stress is to initially hand tighten the packing nuts 134 such that the springs 150 are positioned to the uncompressed or free stack height of the springs 150 as shown in the right side of FIG. 1B. An operator or maintenance person then measures the uncompressed free height of the springs 150 or the distance between the shoulder 152 of the retainer 154 and a surface 156 of the packing flange 130. The packing nuts 134 are then tightened until the springs 150 are fully (e.g., 100%) compressed or substantially flat or solid as shown in the left side of FIG. 1B. The operator or maintenance person then measures the height of the flat or compressed condition of the springs 150. The packing nuts 134 are then loosened to decompress the springs 150 to a desired predetermined measured height between the uncompressed and the fully compressed heights. Again, this method requires the springs 150 to be fully compressed, which may damage the springs 150 or may cause the springs 150 to provide a different load when the springs 150 are decompressed to the desired height compared to a load provided by the springs 150 at the predetermined desired height prior to being fully compressed.

Figure 2A:
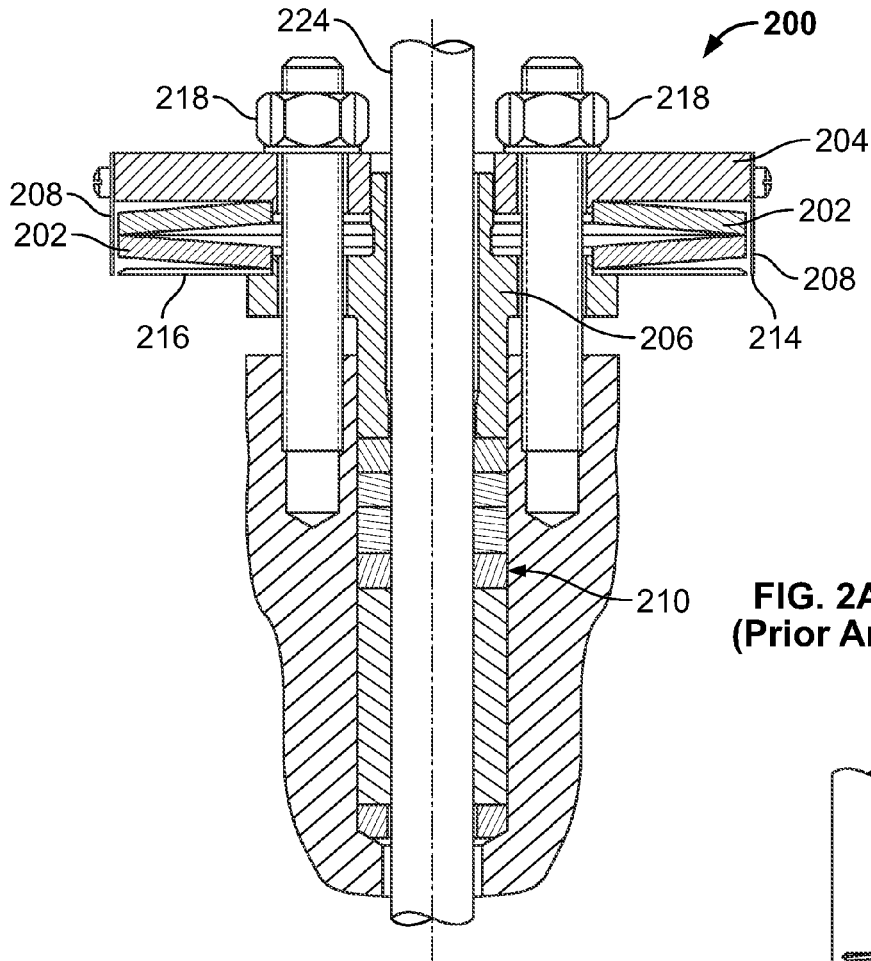
FIGS. 2A and 2B illustrate another known valve packing that may be used to implement the fluid valve of FIG. 1A.
Figure 2B:
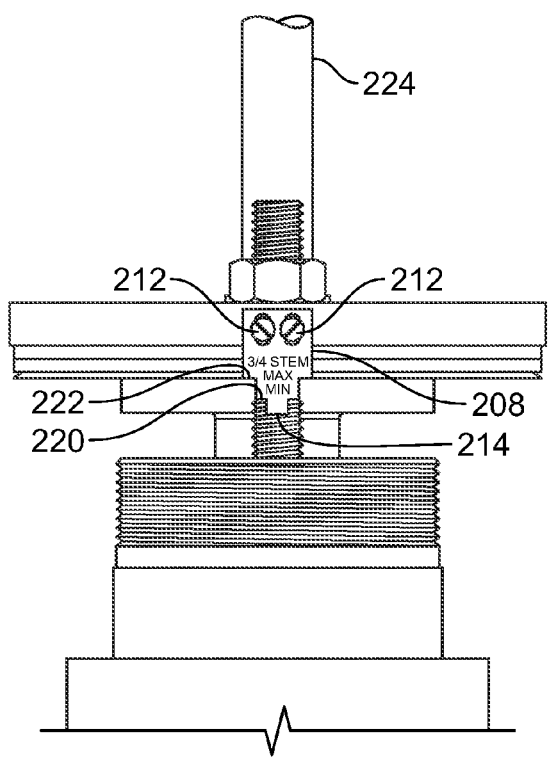

FIGS. 2A and 2B illustrate another known valve packing assembly 200 that may be used to implement the fluid control valve 100 of FIG. 1A. The valve packing assembly 200 includes biasing elements or springs 202 (e.g., Belleville springs) stacked or disposed between a packing flange 204 and a packing retainer or follower 206. One or more gauges or load scales 208 may be coupled to the packing flange 204 to provide an indication of an amount of compression or deflection of the springs 202 and, thus, an indication of the packing stress imparted to a packing seal 210 (e.g., a graphite seal). To adjust the load scale 208, the springs 202 are compressed slightly and the packing flange 204 is moved to the free stack height position of the springs 202. The load scale 208 is coupled to the packing flange 204 via fasteners 212 such that a bottom edge 214 of tile load scale 208 aligns with an indicator disk 216 when the springs 202 are in the free stack height position (as shown in FIG. 2A). Once the load scale 208 is coupled to the packing flange 204, packing nuts 218 may be tightened to align the indicator disk 216 with a minimum compression line or marking 220 or a maximum compression line or marking 222 on the load scale 208.

Although the load scale 208 provides a visual indication of the packing stress, the load scale 208 does not provide a positive stop to prevent deflection or compression of the springs 202 beyond a deflection indicated by the maximum compression line 222. Thus, the packing material 210 may be subjected to a packing stress that is greater than a maximum desired packing stress if the springs 202 are deflected to a position beyond the position indicated by the maximum compression line 222.

Furthermore, the load scale 208 is sized for a particular valve stem size (e.g., a diameter of a valve stem). For maximum operating life and to operate the valve packing assembly 200 within a desired range of packing friction between a valve stem 224 and the packing material 210, a load scale must be used with a corresponding valve stem size. However, this configuration may be prone to human error. Additionally, the valve packing assembly 200 uses larger sized (e.g., larger diameter) springs 202 to provide a deflection that can be visually measured via the gauge scale 208. However, such a configuration enlarges the overall envelope of the valve packing assembly 200 and may not be suitable for applications in which an overall smaller footprint is required.

FIGS. 3A and 3B illustrate different views of an example live-load valve packing assembly 300 described herein. Referring to FIGS. 3A-3C, the example valve packing assembly 300 includes a load assembly 302 to provide a load or packing stress to a packing material or seal assembly 304. The seal assembly 304 (e.g., a graphite packing seal assembly) is disposed within a packing bore 306 of a bonnet 308 to provide a fluid seal around a valve stem 310 slidably received by the packing bore 306. Axially loading the seal assembly 304 about an axis 312 causes the seal assembly 304 to expand radially to effect a dynamic seal on the moving valve stem 310 and a static seal in the packing bore 306 where an outer surface 314 of the seal assembly 304 is in contact with the packing bore 306. The bonnet 308 couples a valve (e.g., the valve 104 of FIG. 1A) to an actuator (e.g., the actuator 102 of FIG. 1A). The packing bore 306 slidably receives the valve stem 310 as the actuator moves the valve stem 310 between a first position (e.g., an open position) and a second position (e.g., a closed position).

The load assembly 302 is removably coupled to the bonnet 308 via packing studs 316a and 316b and packing nuts 318a and 318b. The packing nuts 318a-b are threadably coupled to the respective packing studs 316a-b and are turned (e.g., tightened or loosened) to adjust the loading or packing stress on the seal assembly 304 within the bonnet 308 and around the valve stem 310. The bonnet 308 also includes threaded bores 320 to threadably receive the packing studs 316a-b.

In this example, the load assembly 302 includes a first flange or packing flange 322 and a second flange or stop flange 324. The packing flange 322 and the stop flange 324 include respective central openings 326 and 328 (FIG. 3C) to slidably receive the valve stem 310. The packing flange 322 includes an aperture 330 that coaxially aligns with an aperture 332 of the stop flange 324 to slidably receive the packing stud 316a. As most clearly shown in FIG. 3B, the aperture 330 of the packing flange 322 and the corresponding aperture 332 of the stop flange 324 are sized slightly larger than the diameter of the packing stud 316a so that the packing flange 322 and the stop flange 324 can move in a rectilinear direction along the valve stem 310 (i.e., the axis 312).

In this example, the load assembly 302 includes biasing elements or springs 334 that are disposed or stacked between the packing flange 322 and the stop flange 324. In this example, the biasing elements 334 include a plurality of Belleville springs stacked in series between the packing flange 322 and the stop flange 324 to provide a load or packing stress to the seal assembly 304.

As shown in FIGS. 3A-3C, the packing flange 322 includes an aperture 336a having an axis 338 that is substantially parallel to, but spaced a distance from, an axis 340 of an aperture 342a of the stop flange 324. A first guide member or stop screw 344a is coupled to the packing flange 322 via the aperture 336a and a second guide member or stop screw 346a is coupled to the stop flange 324 via the second aperture 342a. However, in other examples, the packing flange 322; may only include the aperture 336a to receive the first guide member 344a or the stop flange 324 may only include the aperture 342a to receive the second guide member 346a.

In illustrated example, the first guide member 344a is positioned relative to the stop flange 324 to provide a first predetermined distance between the packing flange 322 and the stop flange 324. For example, the first guide member 344a is positioned such that the packing flange 322 deflects the biasing elements 334 an amount corresponding to a predetermined packing stress. Thus, the first predetermined distance provides an indication of a first predetermined load to be provided to the seal assembly 304 when the packing flange 322 and the stop flange 324 are spaced at the first predetermined distance provided by the first guide member 344a. The first guide member 344a also provide a mechanical stop to prevent the load assembly 302 from applying a load to the seal assembly 304 that is greater than the first predetermined load. For example, the first predetermined distance may correspond to a nominal packing stress to be provided to the seal assembly 304.

The second guide member 346a is coupled to the stop flange 324 and positioned relative to the packing flange 322 to provide a second predetermined distance between the packing flange 322 and the stop flange 324. For example, the second guide member 346a is positioned such that the packing flange 322 deflects the biasing elements 334 an amount corresponding to a second predetermined packing stress when the packing flange 322 and the stop flange 324 are spaced a distance provided by the second guide member 346a. Thus, the second guide member 346a provides an indication of a second predetermined load to be provided to the seal assembly 304 when the packing flange 322 and the stop flange 324 are spaced at the second predetermined distance. The second guide member 346a also provides a mechanical stop to prevent the load assembly 302 from applying a load to the seal assembly 304 that is greater than a second predetermined load that corresponds to the second predetermined distance between the packing flange 322 and the stop flange 324 provided by the second guide member 346a. For example, the second predetermined load may correspond to a maximum desired packing stress to be provided to the seal assembly 304.

The valve packing assembly 300 also includes a packing retainer or packing follower 348 to operatively couple the load assembly 302 to the seal assembly 304. In this example, the stop flange 324 is positioned between the packing retainer 348 and the packing flange 322. Thus, the load assembly 302 provides a load to the seal assembly 304 via the packing retainer 348. As shown, the packing retainer 348 includes a follower flange 350 disposed between a base portion 352 and a sleeve portion 354. The packing retainer 348 is disposed between the stop flange 324 and the seal assembly 304 such that an edge 356 of the base portion 352 engages the seal assembly 304 and the follower flange 350 engages a surface 358 of the stop flange 324. The sleeve portion 354 is sized to slidably fit within the central openings 326 and 328 of the packing flange 322 and the stop flange 324. The packing retainer 348 includes an opening 360 to slidably receive the valve stem 310 and may be lined with carbon filled Polytetrafluoroethylene (PTFE) or other suitable material. In this example, the load assembly 302 is operatively coupled to the seal assembly 304 via the packing retainer 348. The load assembly 302 applies a load to the packing retainer 348 to move the packing retainer 348 in a rectilinear direction along the axis 312 toward the seal assembly 304.

The example load assembly 302 enables precise control over a desired packing stress imparted to the seal assembly 304 by enabling precise control of the amount of deflection of the biasing elements 334. Such accurate control of the packing stress significantly improves the performance of the valve packing assembly 300 and significantly reduces packing stress variability compared to known live-load valve packings such as those described in connection with FIGS. 1B, 2A, and 2B.

To precisely control the packing stress, the valve packing assembly 300 is assembled as shown in FIGS. 3A-3C. The packing nuts 318a-b are adjusted to a position corresponding to at least approximately a free condition or free stack height of the biasing elements 334. For example, the packing nuts 318a-b may be hand tightened to a free stack height position of the biasing elements 334 such that the packing flange 322 provides a relatively light load on the biasing elements 334. In this manner, the biasing elements 334 and/or the packing flange 322 may be accurately or approximately positioned to the free stack height of the biasing elements 334.

When the valve packing assembly 300 is in the free stack height condition, the first guide member 344a is adjusted (e.g., via a tool) such that a first gap $G_1$ (e.g., a gap of 0.122 inches) is formed between a reference surface 362 of the first guide member 344a and a reference surface 364 of the stop flange 324. Although not shown, a gauge tool may be used to measure the gap $G_1$. Additionally or alternatively, the second guide member 346a is adjusted (e.g., via a tool) such that a second gap $G_2$ (e.g., a gap of 0.164 inches) is formed between a reference surface 366 of the second guide member 346a and a reference surface 368 of the packing flange 322. Fasteners 370 (e.g., a lock nut) lock or secure the position of the first and second guide members 344a and 346a to the respective packing flange 322 and the stop flange 324 after the predetermined gaps $G_1$ and $G_2$ are adjusted.

The packing nuts 318a-b are turned or tightened until the reference surface 362 of the first guide member 344a engages the reference surface 364 of the stop flange 324. The packing nuts 318a-b may be alternately turned or tighten to maintain the packing flange 322 substantially parallel with the stop flange 324. As shown in this example, the packing flange 322 includes an aperture (not shown) to receive a third guide member 344b and the stop flange 324 includes an aperture (not shown) to receive a fourth guide member 346b to help maintain the packing flange 322 substantially parallel to the stop flange 324 and/or a surface 372 of the bonnet 308 when loading the seal assembly 304. In other examples, a plurality of apertures may be spaced about a periphery of the packing flange 322 to receive a plurality of guide members spaced at the first gap $G_1$ relative to the stop flange 324 and/or a plurality of apertures may be spaced about the periphery of the stop flange 324 to receive a plurality of guide members spaced at the second gap $G_2$ relative to the packing flange 322.

In this example, the first guide member 344a provides a mechanical stop to prevent further movement of the packing flange 322 toward the stop flange 324 when the reference surface 362 of the first guide member 344a engages the reference surface 364 of the stop flange 324. If additional torque is applied to the packing nuts 318a-b (i.e., the packing nuts are tightened) when the first guide member 344a engages the stop flange 324, the first guide member 344a will not allow additional loading to be imparted to the seal assembly 304. Instead, the first guide member 344a will absorb or take the additional loading.

As noted above, biasing elements such as Belleville springs that are stacked in series provide a load based on the amount of deflection exerted on the stack of biasing elements regardless of the overall height of the stack of biasing elements. In other words, the first gap $G_1$ between the first guide member 344a and the stop flange 324 provides a predetermined distance to control the deflection of the biasing elements 334 between the position of the packing flange 322 corresponding to a free stack height position of the biasing elements 334 and the position of the packing flange 322 relative to the stop flange 324 when the first guide member 344a engages the stop flange 324.

Thus, a first set of biasing elements (e.g., a stack of three Belleville springs) having a first stack height will provide a load to the seal assembly 304 when deflected an amount corresponding to the first gap $G_1$ that is substantially equal to a load provided by a second different set of biasing elements (e.g., a stack of three Belleville springs) having a second stack height different from the first stack height (e.g., due to stack-up tolerance) where the second set of biasing elements is deflected to a position corresponding to the first gap $G_1$. Thus, the valve packing assembly 300 limits the packing stress applied to the seal assembly 304 to a load that corresponds to the amount of deflection provided by the first predetermined distance or the first gap $G_1$. Additionally or alternatively, by adjusting the first guide member 344a to the first gap $G_1$ after the packing flange 322 is positioned to the free stack height of the biasing elements 334, tolerance stack-up of the biasing elements 334 is controlled and does not affect the amount of load imparted on the seal assembly 304. Additionally or alternatively, in other examples, the gaps $G_1$ and $G_2$ may be adjusted (e.g., increased) proportionately as a function of the stack height of the biasing elements (e.g., a stack of five Belleville springs). In other words, the gaps $G_1$ and $G_2$ may be adjusted to provide a predetermined amount or percentage of deflection relative to the stack height of the biasing elements stacked in series to provide a load that corresponds to the amount of deflection imparted on the biasing elements.

To provide a maximum packing stress, the first guide member 344a is positioned or moved (e.g., removed) such that at least a gap between the first guide member 344a and the stop flange 324 is greater than the second gap $G_2$. The packing nuts 318a-b are then tightened until the reference surface 368 of the packing flange 322 engages the reference surface 366 of the second guide member 346a. In this example, the second guide member 346a provides a mechanical stop to prevent further movement of the packing flange 322 toward the stop flange 324 when the reference surface 366 of the second guide member 346a engages the reference surface 368 of the packing flange 322.

The first and second gaps $G_1$ and $G_2$ of the respective first and second guide members 344a and 346a may be set at the factory and/or adjusted in the field. Additionally, the loading may be adjusted (e.g., increased or decreased) by adjusting the first and/or second gaps $G_1$ and $G_2$ of the respective first guide member 344a or the second guide member 346a. For example, the first guide member 344a and/or the second guide member 346a may be repositioned a predetermined distance by, for example, turning the first guide member 344a or the second guide member 346a a predetermined number of turns or a partial turn.

During operation, wear of the seal assembly 304 may cause the stop flange 324 and the packing retainer 348 to move toward the seal assembly 304, thereby causing the reference surface 362 of the first guide member 344a to move away from the reference surface 364 of the stop flange 324. The biasing elements 334 may decompress but continue provide a substantially constant load to the seal assembly 304. During maintenance, the packing nuts 31Ba-b can be tightened so that the first guide member 344a engages the stop flange 324. In other examples, the first gap $G_1$ can be readjusted and the packing nuts 318a-b can be tightened so that the first guide member 344a engages the stop flange 324.

The example valve packing assembly 300 may be used with stroke valves (e.g., the fluid control valve 100), rotary valves, or any other type of fluid control device that requires a live-loaded valve packing.

Figure 4A:
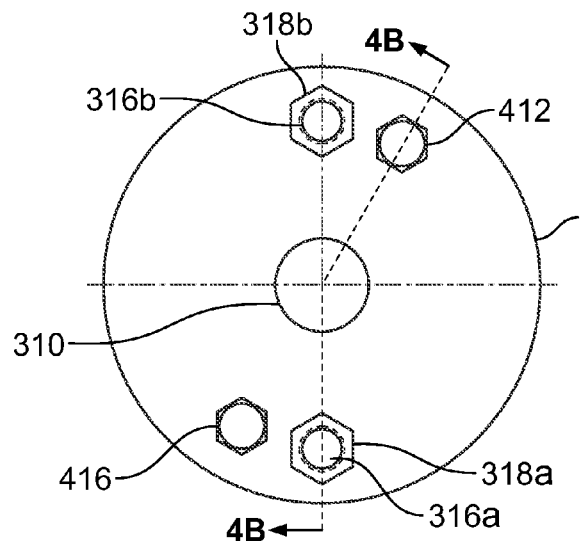
FIGS. 4A-4C illustrate another example load assembly described herein that may be used to implement the valve packing assembly of FIGS. 3A-3C.
Figure 4C:
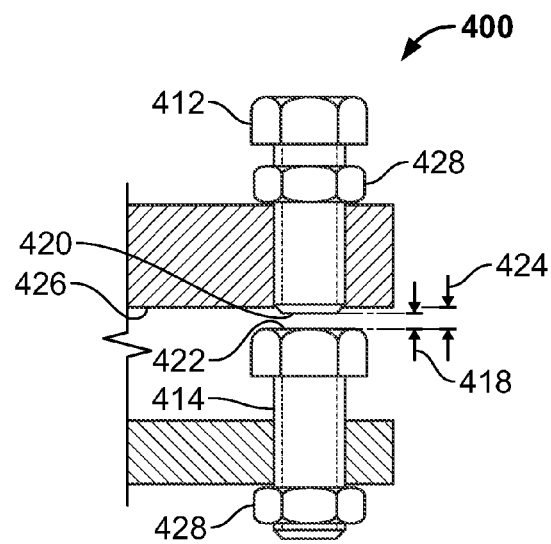
Figure 4B:
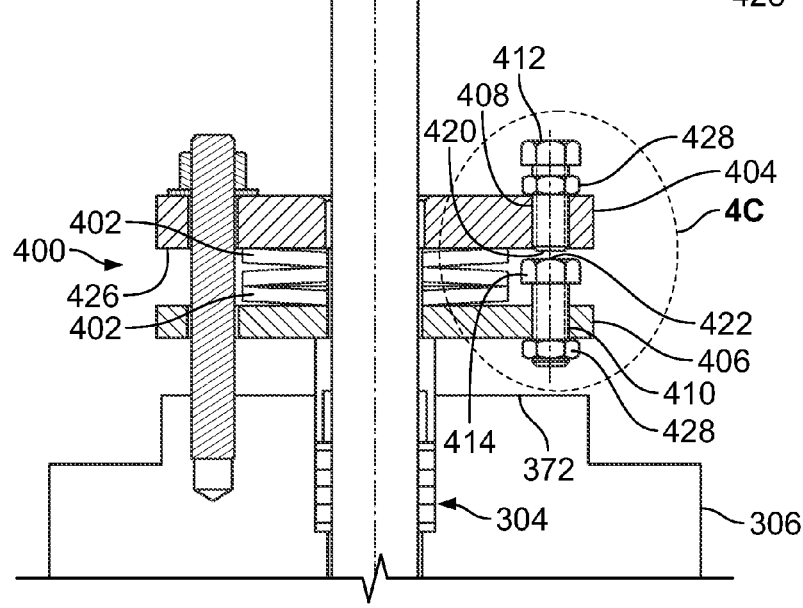

FIGS. 4A-4C illustrate different views of another example load assembly 400 that may be used to implement the example valve packing assembly 300 to provide a predetermined load or packing stress. Although the example load assembly 400 is described in connection with the valve packing assembly 300, the load assembly 400 may be used or associated with any other suitable valve packing assembly.

Those components of the example load assembly 400 of FIGS. 4A-4C that are substantially similar or identical to those components of the example load assembly 302 described above and that have functions substantially similar or identical to the functions of those components will not be described in detail again below. Instead, the interested reader is referred to the above corresponding descriptions in connection with FIGS. 3A-3C. Those components that are substantially similar or identical will be referenced with the same reference numbers as those components described in connection with FIGS. 3A-3C.

Referring to FIGS. 4A-4C, the load assembly 400 includes biasing elements 402 disposed between a packing flange 404 and a stop flange 406. In this example, in contrast to the load assembly 300 of FIGS. 3A-3C, an aperture 408 of the packing flange 404 is coaxially aligned with an aperture 410 of the stop flange 406. A first guide member 412 is disposed in the aperture 408 of the packing flange 404 and a second guide member 414 is disposed in the aperture 410 of the stop flange 406. In this example, packing flange 404 includes a third guide member 416 coaxially aligned with a fourth guide member (not shown) of the stop flange 406 to help maintain the packing flange 404 substantially parallel to the stop flange 406 and/or the surface 372 of the bonnet 308 when the load assembly 400 is being adjusted to provide a load to the seal assembly 304.

During assembly, the packing nuts 318a-b are tightened so that the biasing elements 402 deflect slightly to provide a relatively light load to position the packing flange 404 to approximately the free stack height position of the biasing elements 402. As most clearly shown in FIG. 4C, a first predetermined gap 418 is provided between a reference surface 420 of the first guide member 412 and a reference surface 422 of the second guide member 414. Additionally, a second predetermined gap 424 is provided between the reference surface 422 of the second guide member 414 and a reference surface 426 of the packing flange 404. In the illustrated example, the second guide member 414 is positioned to the second predetermined gap 424 and then the first guide member 412 is positioned to the first predetermined gap 418. Fasteners 428 (e.g., lock nuts) lock or secure the positions of the first and second guide members 412 and 414 to the packing flange 404 and the stop flange 406, respectively, after the predetermined gaps 418 and 424 are set or adjusted. The predetermined gaps 418 and 424 may be factory set or may be field adjusted.

To load the seal assembly 304 to a predetermined packing stress associated with the first predetermined gap 418, the packing nuts 318a-b are tightened (e.g., hand tightened) until the reference surface 420 of the first guide member 412 engages the reference surface 422 of the second guide member 414. To load the seal assembly 304 to a predetermined packing stress associated with the second predetermined gap 424, the first guide member 412 is removed or positioned such that a gap between the reference surface 420 of the first guide member 412 and the reference surface 422 of the second guide member 414 is greater than the second predetermined gap 424. The packing nuts 318a-b are then tightened until the reference surface 426 of the packing flange 404 engages the reference surface 422 of the second guide member 414.

In this example, the first guide member 412 provides a mechanical stop to prevent or restrict the load assembly 400 from applying a packing stress to the seal assembly 304 that is greater than the packing stress associated with the first predetermined distance 418. In other words, the first guide member 412 prevents the load assembly 400 from deflecting the biasing elements 402 an amount greater than the first predetermined distance 418. Likewise, the second guide member 414 provides a mechanical stop to prevent or restrict the load assembly 402 from applying a packing stress to the seal assembly 304 that is greater than the packing stress provided when the biasing elements 402 are deflected an amount corresponding to the second predetermined distance 424.

Figure 5A:
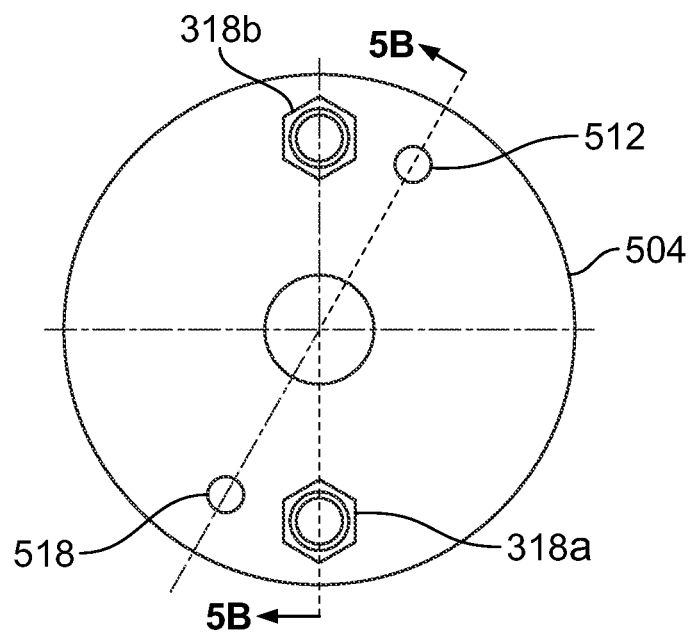
FIGS. 5A and 5B illustrate another example load assembly described herein that may be used to implement the valve packing assembly of FIGS. 3A-3C.
Figure 5B:
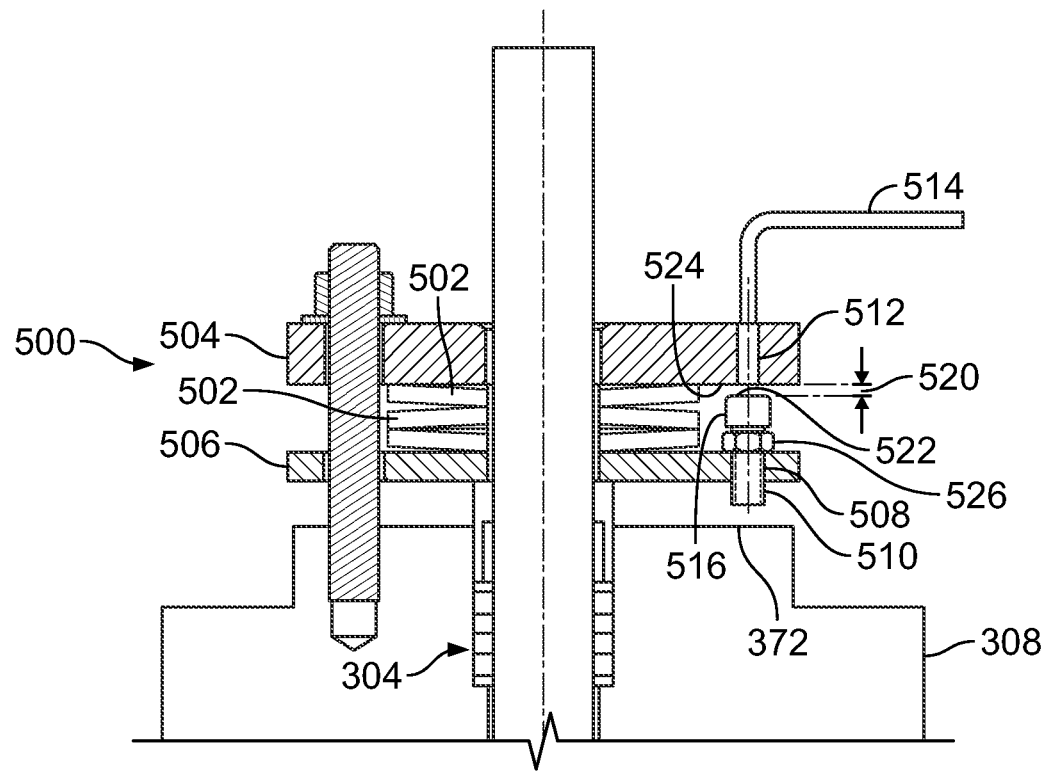

FIGS. 5A and 5B illustrate different views of yet another example load assembly 500 described herein that may be used with the example valve packing assembly 300 of FIGS. 3A-3C.

The example load assembly 500 includes biasing elements or springs 502 (e.g., Belleville springs stacked in series) disposed between a packing flange 504 and a stop flange 506. The stop flange 506 includes an aperture 508 to receive a guide member 510 and the packing flange 504 includes an aperture 512 coaxially aligned with the aperture 508 of the stop flange 506 to receive a tool 514.

The guide member 510 may be, for example, a socket-head stop screw 516. The tool 514 (e.g., an Allen wrench) may be used to adjust the position of the guide member 510 via the aperture 512 of the packing flange 504. As shown in this example, a second guide member 518 may be provided to maintain the packing flange 504 substantially parallel to the stop flange 506 and/or the surface 372 of the bonnet 308 when loading the seal assembly 304. Additionally, the use of the tool 514 may facilitate adjustment of the guide member 510 by counting the number of turns or rotations of the tool 514 during adjustment of the guide member 510.

During assembly, the packing nuts 318a-b are tightened so that the biasing elements 502 deflect slightly to provide a relatively light load to position the packing flange 504 to approximately the free stack height position of the biasing elements 502. A predetermined gap 520 is provided between a reference surface 522 of the guide member 510 and a reference surface 524 of the packing flange 504. A fastener 526 (e.g., a lock nut) may be used to lock or secure the position of the guide member 510 after the predetermined gap 520 is adjusted. The predetermined gap 520 may be factory set and/or may be adjusted in the field.

To load the seal assembly 304 to a predetermined packing stress associated with the predetermined gap 520, the packing nuts 318a-b are tightened until the reference surface 522 of the guide member 510 engages the reference surface 524 of the packing flange 504. The packing nuts 318a-b cause the packing flange 504 to move toward the stop flange 506 until the packing flange 504 engages the guide member 510, thereby causing the biasing elements 502 to deflect a predetermined distance corresponding to the predetermined gap 520.

The predetermined gap 520 may correspond to a maximum desired packing stress, a nominal packing stress, or any desired packing stress to be imparted to the seal assembly 304. For example, the predetermined gap 520 may be adjusted to provide a predetermined distance between the packing flange 504 and the stop flange 506 that deflects the biasing elements 502 to provide a maximum desired packing stress to the seal assembly 304. Thus, if the predetermined gap 520 is associated with a maximum packing stress, the packing nuts 318a-b may then be loosened to cause the reference surface 524 of the packing flange 504 to move away from the reference surface 522 of the guide member 510 to provide a packing stress that is less than tile packing stress provided when the packing flange 504 engages the guide member 510. The packing nuts 318a-b may be loosened a predetermined number of turns (e.g., 1 turn) from the position in which the packing flange 504 engages guide member 510 to decompress or reduce the deflection of the biasing elements 502 to a controlled desired packing stress that is less than the maximum packing stress.

Figure 6:
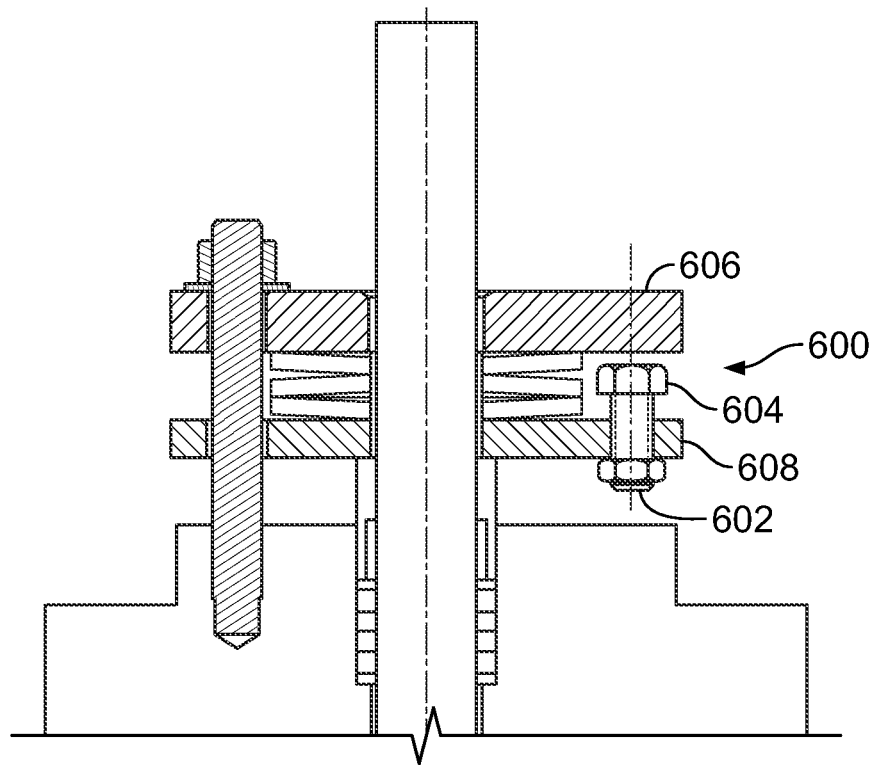
FIG. 6 illustrates yet another example load assembly described herein that may be used to implement the valve packing assembly of FIGS. 3A-3C.

The example guide member 510 is not limited to a socket-head stop screw as shown in FIGS. 5A and 51B. For example, as shown in FIG. 6, an example load assembly 600 includes a guide member 602 having hex-shaped head or portion 604. Additionally or alternatively, in this example, a packing flange 606 may be provided without having to manufacture (e.g., machine) apertures (e.g., the aperture 512 of FIGS. 5A and 5B) to receive a tool (e.g., the tool 514). Instead, a tool may access the guide member 602 between the packing flange 606 and a stop flange 608.

FIGS. 7A-7D illustrate different views of yet another example load assembly 700 that may be used to implement the example valve packing assembly 300 of FIGS. 3A-3B. The example load assembly 700 includes biasing elements 702 disposed between a packing flange 704 and a gauge flange 706. In this example, a first guide member 708a is coupled to the gauge flange 706 and is at least partially received by a first aperture 710a of the packing flange 704. A second guide member 712a different from the first guide member 708a is coupled to the gauge flange 706 and is at least partially received by a second aperture 710b of the packing flange 704. In this example, a third guide member 708b substantially similar to the first guide member 708a is coupled to the gauge flange 706 and received by an aperture 710c of the packing flange 704. A fourth guide member 712b substantially similar to the second guide member 712a is coupled to the gauge flange 706 and received by an aperture 710d of the packing flange 704. The apertures 710a-d and the guide members 708a-b and 712a-b are spaced about a periphery of the respective packing flange 704 and the gauge flange 706 to facilitate maintaining the packing flange 704 substantially parallel to the gauge flange 706 when loading the seal assembly 304.

Figure 7A:
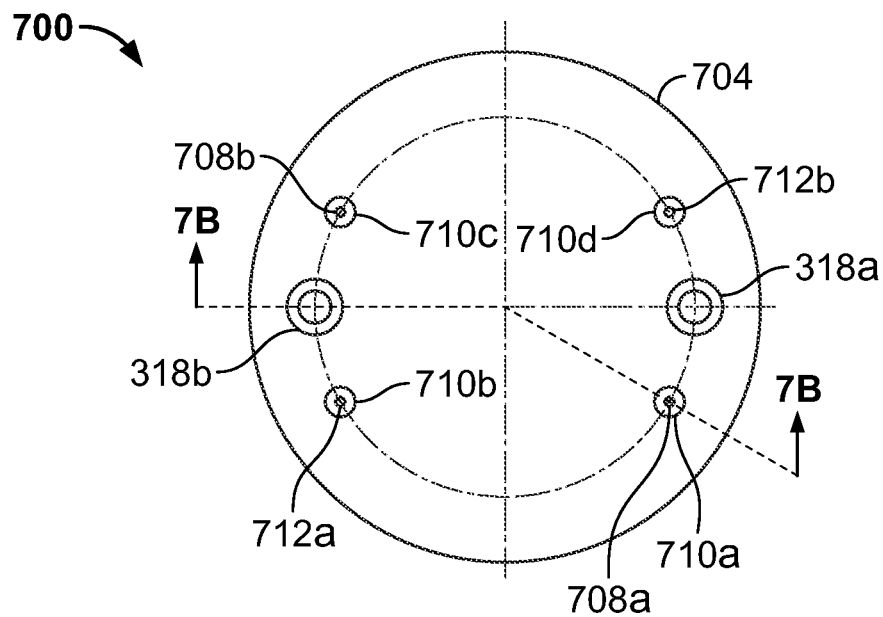
FIGS. 7A-7D illustrate yet another example load assembly described herein that may be used to implement the valve packing assembly of FIGS. 3A-3C.
Figure 7B:
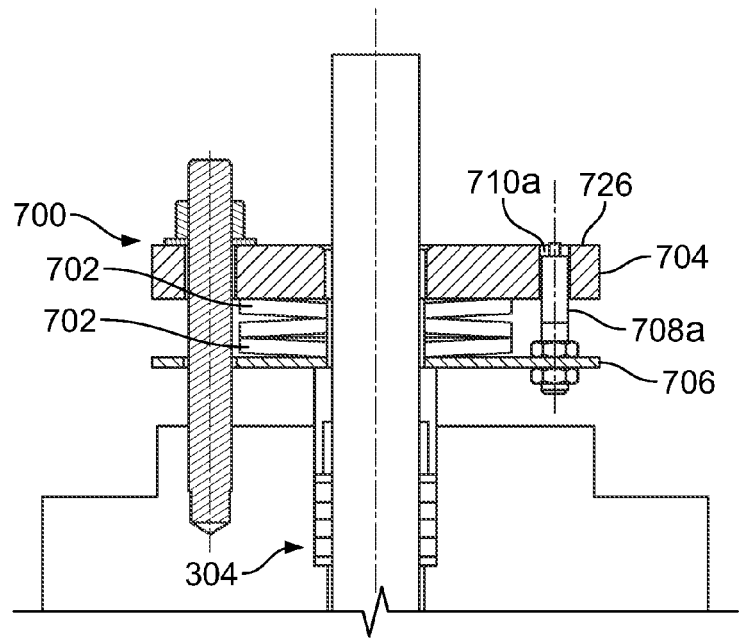
Figure 7C:
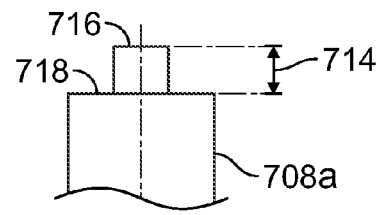

Referring the FIG. 7C, the first guide member 708a includes a stepped surface to provide a first predetermined distance 714 between a first or end surface 716 and a second or reference surface 718. This distance corresponds to a predetermined gap at which the packing flange 704 may be set to provide a deflection to the biasing elements 702 that provides a predetermined packing stress to the seal assembly 304. For example, such a gap may be set to provide a nominal packing stress to the packing seals.

Figure 7D:
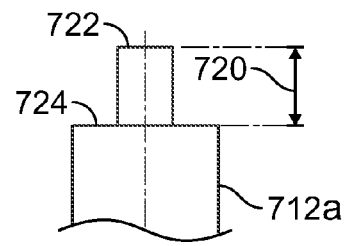

Referring the FIG. 7D, the second guide member 712a is a guide pin that includes a stepped surface to provide a second predetermined distance 720 between a first surface 722 and a second surface 724. The distance 720 corresponds to a predetermined gap at which the packing flange 704 is positioned to provide a deflection to the biasing elements 702 that provides a second predetermined packing stress to the seal assembly 304 that is different (e.g., greater than) the first predetermined packing stress. For example, such a gap may be set to provide a maximum desired packing stress to the seal assembly 304.

Thus, the example load assembly 700 includes a first set of first guide members 708a-b to indicate, for example, a nominal packing stress to be applied to the packing seals and a second set of guide members 712a-b to indicate, for example, a maximum desired packing stress to be applied to the packing seals.

During assembly, the packing stress may be set at the factory and/or the in the field. The packing nuts 318a-b are tightened to an initial position corresponding at least approximately to a free stack height condition of the biasing elements 702 (e.g., a hand-tight position). The first guide members 708a-b and the second guide members 712a-b are coupled to the gauge flange 706. When the packing flange 704 is at the free stack height position, the first and the second guide members 708a-b and 712a-b are adjusted such that the respective end surfaces 716 and 722 substantially align with (e.g., are flush with) a reference surface 726 (e.g., a top surface) of the packing flange 704. Although not shown, a tool (e.g., a plate, a ruler, etc.) may be used to determine if the end surfaces 716 and 722 are substantially aligned with the reference surface 726 of the packing flange 704. For example, a flat ruler may be held against the reference surface 726 over the aperture 710a of the packing flange 704 and the first guide members 708a-b and the second guide members 712a-b may be adjusted until the end surface 716 engages the ruler.

To set the packing stress to the packing stress provided when the biasing elements 702 are deflected to the first predetermined distance 714 (e.g., the nominal packing stress), the packing nuts 318a-b are tightened until the reference surface 718 of the first guide members 708a-b substantially aligns with the reference surface 726 of the packing flange 704. Again, a tool may be used to determine that the reference surface 718 of the first guide members 708a-b is substantially aligned with the reference surface 726 of the packing flange 704. Similarly, to adjust the packing stress to the packing stress provided when the biasing elements 702 are deflected to the second predetermined distance 720 (e.g., the maximum desired packing stress), the packing nuts 318a-b are further tightened until the reference surface 724 of the second guide members 712a-b substantially align with the reference surface 726 of the packing flange 704.

Figure 8:
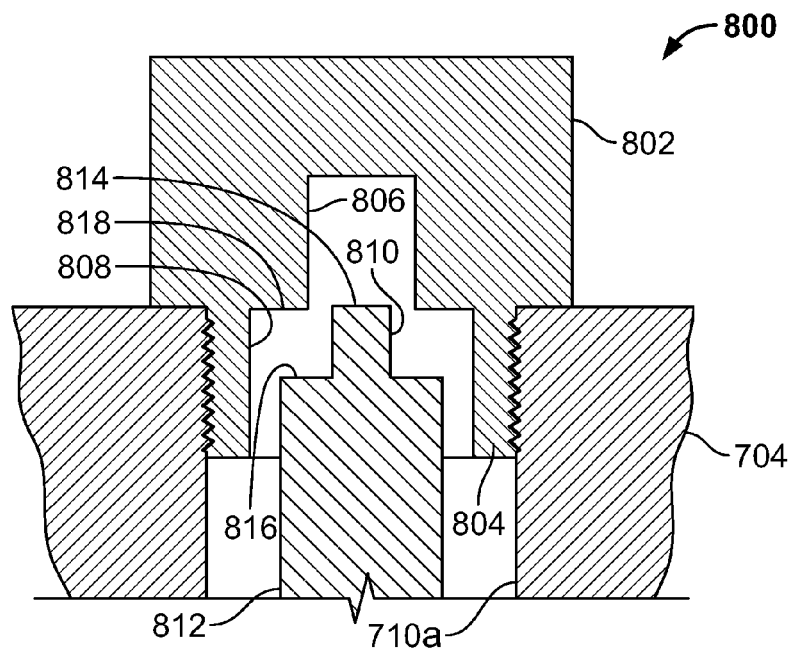

FIG. 8 illustrates an example positive stop 800 that may be used with the example load assembly 700 of FIGS. 7A-7D. The positive stop 800 includes a cylindrical body 802 having a threaded portion 804 to threadably couple to the aperture 710a of the packing flange 704. The positive stop 800 includes a first aperture 806 and a counterbore 808. The first aperture 806 is sized to receive a portion 8 10 of a guide member 812 between an end surface 814 and a reference surface 816 of the guide member 812. In this example, the guide member 812 has a diameter that is smaller than the diameter of the guide member 708a of FIGS. 7A-7C. Alternatively, the aperture 710a of the packing flange 704 may be sized larger (e.g., have a larger diameter) to receive a larger positive stop member having a counterbore to receive, for example, the guide member 708a.

In this example, the counterbore 808 is sized to slidably receive the guide member 812. The reference surface 816 of the guide member 812 engages a shoulder 818 formed between the counterbore 808 and the aperture 806 to prevent the packing flange 704 from moving toward the gauge flange 706 (see FIG. 7B). Thus, the positive stop 800 prevents deflection of the biasing elements 702 beyond the deflection provided when the reference surface 816 engages the shoulder 818. In this manner, the positive stop 800 prevents the load assembly (e.g., the load assembly 702 of FIG. 7B) from applying a load to the seal assembly 304 that exceeds the packing stress associated with the predetermined distance provided by the guide member 812. In some examples, a thickness of the gauge flange 706 may be increased.

FIG. 9 illustrates another example positive stop 900 that may be used with the example load assembly 700 of FIGS. 7A-7D. In this example, the positive stop 900 is formed (e.g., integrally formed) in the packing flange 704. In this example, a counterbore 902 is formed within the aperture 710a of the packing flange 704. The counterbore 902 may be sized to form a shoulder 904 that engages a reference surface 906 of a guide member 908. The shoulder 904 is spaced a distance from the reference surface 726 of the packing flange 704 so that when an end surface 910 of the guide member 908 is flush with the reference surface 726 of the packing flange 704, the guide member 908 can only travel in rectilinear motion toward the reference surface 726 a predetermined distance 912. Alternatively, a portion of the guide member 908 may be sized (e.g., may be increased in length) to provide a predetermined distance (e.g., a predetermined distance greater than the predetermined distance 912) between the reference surface 726 and the reference surface 906.

Thus, the positive stop 900 prevents the deflection of the biasing elements 702 beyond the deflection provided by the predetermined distance 912 to prevent the load assembly 700 from applying a packing stress to the seal assembly 304 that exceeds a packing stress that correlates to the predetermined distance 912 provided by the guide member 908. In other examples, the aperture 710b may be formed with the positive stop 900 to prevent the load assembly 700 from applying a packing stress that is greater than the packing stress associated with a second predetermined distance.

FIGS. 10A and 10B illustrate different views of yet another example load assembly 1000 that may be used with the example valve packing assembly 300. In this example, the load assembly 1000 includes biasing elements 1002 disposed between a packing flange 1004 and a gauge flange 1006. A guide member 1008 is coupled to the gauge flange 1006 and is at least partially received by an aperture 1010 of the packing flange 1004. In contrast to the guide members 708a-b and 708c-d of FIGS. 7A-7D, the guide member 1008 includes multiple stepped surfaces spaced apart at different predetermined distances or gap measurements that correspond to respective predetermined packing stresses to be applied by the biasing elements 1002.

In this example, as shown in FIG. 10B, the guide member 1008 includes a first stepped surface to provide a first predetermined distance or gap 1012 between an end surface 1014 and a first reference surface 1016. The guide member 1008 also includes a second stepped surface to provide a second predetermined distance or gap 1018 between the end surface 1014 and a second reference surface 1020. The example guide member 1008 reduces the number of apertures (e.g., the apertures 710b-d) required in the packing flange 1004 and the gauge flange 1006, thereby reducing manufacturing costs. The method to adjust the load assembly 1000 is substantially similar to the method of adjusting the load assembly 700 described above in connection with FIGS. 7A-7D and, thus, will not be repeated. Instead, the interested reader is directed to the description of the load assembly 700 described above in connection with FIGS. 7A-7D.

Although certain methods and apparatus have been described herein, the scope of coverage of this patent is not limited thereto. To the contrary, this patent covers all methods and apparatus fairly falling within the scope of the appended claims either literally or under the doctrine of equivalents.

What is claimed is:

1. An apparatus to load a valve packing, comprising:
  a load assembly having a biasing element disposed between a valve packing flange and a stop flange to provide a load to a seal, the packing flange is adjustable relative to the stop flange to adjust the load to be applied to the seal; and
  a first guide member coupled to a fist aperture of the packing flange or a second aperture of the stop flange to provide a first predetermined distance between the packing flange and the stop flange, the first guide member being rotatable relative to the packing flange or the stop flange about an axis of the first aperture or the second aperture to adjust the first predetermined distance, the first guide member to provide an indication of a first predetermined load to be provided by the load assembly when the packing flange and the stop flange are spaced at the first predetermined distance provided by the first guide member, the first guide member is to mechanically stop the load assembly from applying a load to the seal that is greater than the first predetermined load.

2. An apparatus as defined in claim 1, wherein the first guide member is disposed within the first aperture of the packing flange or the second aperture of the stop flange.

3. An apparatus to load a valve packing, comprising:
  a load assembly having a biasing element disposed between a valve packing flange and a stop flange to provide a load to a seal, the packing flange is adjustable relative to the stop flange to adjust the load to be applied to the seal;
  a first guide member coupled to a first aperture of the packing flange or a second aperture of the stop flange to provide a first predetermined distance between the packing flange and the stop flange, the first guide member being rotatable relative to the packing flange or the stop flange about an axis of the first aperture or the second aperture to adjust the first predetermined distance, the first guide member to provide an indication of a first predetermined load to be provided by the load assembly when the packing flange and the stop flange are spaced at the first predetermined distance provided by the first guide member; and
  a second guide member coupled to the other of the first aperture of the packing flange or the second aperture of the stop flange to provide a second predetermined distance between the packing flange and the stop flange, wherein the second guide member provides an indication of a second predetermined load to be provided by the load assembly when the packing flange and the stop flange are spaced at the second predetermined distance provided by the second guide member.

4. An apparatus as defined in claim 3, wherein the second guide member is to mechanically stop the load assembly from applying a load to the seal that is greater than the second predetermined load.

5. An apparatus as defined in claim 3, wherein the second guide member is disposed within the first aperture of the packing flange or the second aperture of the stop flange.

6. An apparatus as defined in claim 3, wherein the first guide member is coaxially aligned with the second guide member.

7. An apparatus as defined in claim 3, wherein the first predetermined load comprises a nominal packing stress to be provided to the seal and the second predetermined load comprises a maximum packing stress to be provided to the seal.

8. An apparatus as defined in claim 1, wherein the first guide member comprises a fastener or a pin.

9. An apparatus as defined in claim 8, wherein the pin includes a first stepped surface to provide an indication of the first predetermined load.

10. An apparatus as defined in claim 9, wherein the pin includes a second stepped surface to provide an indication of the second predetermined load.

11. An apparatus to load a valve packing, comprising:
  a load assembly having a biasing element disposed between a valve packing flange and a stop flange to provide a load to a seal, wherein the packing flange is adjustable relative to the stop flange to adjust the load to be applied to the seal; and a guide member coupled to a first aperture of the packing flange or a second aperture of the stop flange to provide a first predetermined distance between the packing flange and the stop flange, the guide member to provide an indication of a first predetermined load to be provided by the load assembly when the packing flange and the stop flange are spaced at the first predetermined distance provided by the first guide member, the guide member comprises a pin that includes a first stepped surface to provide an indication of the first predetermined load and a second stepped surface to provide an indication of the second predetermined load; and a stop removably coupled to the packing flange and coaxially aligned with the pin to mechanically stop the load assembly from applying a load to the seal that is greater than a maximum predetermined load.

12. A packing assembly for use with a valve, comprising:

a seal assembly to be disposed within a bore of a valve bonnet to provide a fluid seal around a valve stem or shaft;

a first flange to be operatively coupled to the seal assembly via a packing retainer, the first flange having a first opening;

a second flange to be disposed between the valve bonnet and the first flange, the second flange having a second opening;

a biasing element to be disposed between the first flange and the second flange, the biasing element to provide a packing stress to the seal assembly;

a first guide member to be positioned within the first opening of the first flange or the second opening of the second flange to provide a first predetermined distance between the first flange and the second flange that corresponds to a first predetermined packing stress to be provided to the seal assembly, the first guide member being movable relative to the first flange or the second flange about an axis of the first opening or the second opening to adjust the first predetermined distance; and a second guide member to be disposed within the first opening of the first flange or the second opening of the second flange to provide a second predetermined distance different than the first predetermined distance between the first flange and the second flange that corresponds to a second predetermined packing stress to be provided to the seal assembly.

13. A valve packing assembly, comprising:

means for providing a load to a seal assembly;

means for providing an indication of a first predetermined load to be provided by the means for providing the load;

means for coupling the means for providing the indication of the first predetermined load to the means for providing the load such that the means for providing the indication of the first predetermined load provides a predetermined distance between a first reference flange of the means for providing the load and a second reference flange of the means for providing the load, the predetermined distance corresponds to the first predetermined load, the means for providing the indication of the first predetermined load to rotate relative to the first reference flange or the second reference flange about an axis parallel to an axis of the means for providing a load to adjust the predetermined distance, wherein the means for providing the indication of the first predetermined load comprises first means for fastening threadably coupled to the first reference flange and spaced a first predetermined distance from a first reference surface, wherein the first means for fastening engages the first reference surface to provide the indication of the first predetermined load; and means for providing an indication of a second predetermined load to be provided by the means for providing the load.

14. A valve packing assembly of claim 13, wherein the means for providing the load comprises means for biasing disposed between the first reference flange and the second reference flange, wherein the first reference flange is movable relative to the second reference flange to increase or decrease the load provided by the means for biasing.

15. A valve packing assembly, comprising:

means for providing a load to a seal assembly;

means for providing an indication of a first predetermined load to be provided by the means for providing the load;

means for coupling the means for providing the indication of the first predetermined load to the means for providing the load such that the means for providing the indication of the first predetermined load provides a predetermined distance between a first reference flange of the means for providing the load and a second reference flange of the means for providing the load, wherein the predetermined distance corresponds to the first predetermined load, the means for providing the indication comprises a first fastener threadably coupled to the first reference flange and spaced a first predetermined distance from a first reference surface, the first fastener to engage the first reference surface to provide an indication of the first predetermined load; and means for providing an indication of a second predetermined load to be provided by the means for providing the load, wherein the means for providing the indication of the second predetermined load comprises a second fastener threadably coupled to the second reference flange and spaced a second predetermined distance from a second reference surface, the second fastener to engage the second reference surface to provide the indication of the second predetermined load.

* * * * *

UNITED STATES PATENT AND TRADEMARK OFFICE
CERTIFICATE OF CORRECTION

| | | |
|---|---|---|
| PATENT NO. | : 8,613,423 B2 | Page 1 of 1 |
| APPLICATION NO. | : 12/535304 | |
| DATED | : December 24, 2013 | |
| INVENTOR(S) | : Hutchens et at. | |

It is certified that error appears in the above-identified patent and that said Letters Patent is hereby corrected as shown below:

In the claims
Column 15, line 65 (Claim 1): before "aperture", replace "fist" with --first--

Signed and Sealed this
Sixteenth Day of February, 2016

Michelle K. Lee
*Director of the United States Patent and Trademark Office*